Dec. 17, 1940.  G. E. LIEDHOLM  2,225,402
METHOD FOR REACTIVATING CATALYSTS
Filed June 15, 1939
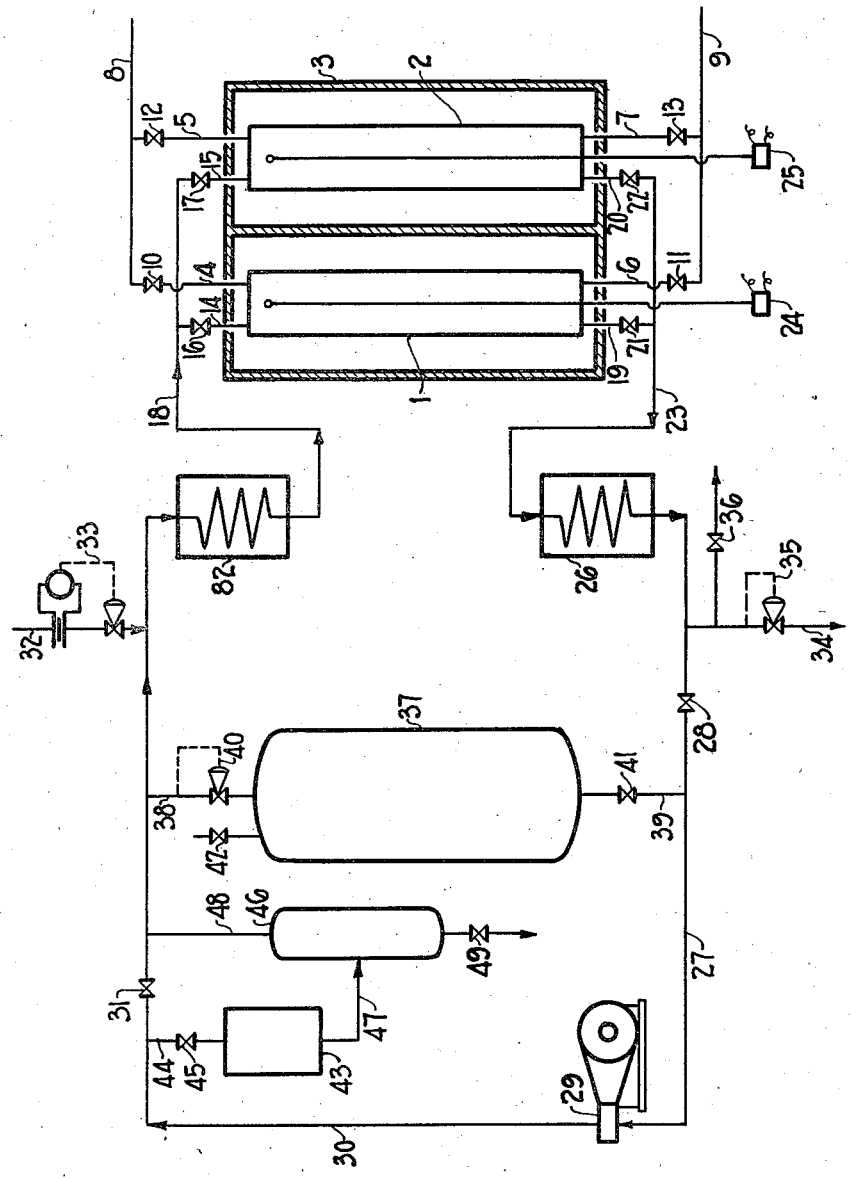
Inventor: George Edward Leidholm
By his Attorney: Arthur B Bakalar Patented Dec. 17, 1940

2,225,402

UNITED STATES PATENT OFFICE 2,225,402

METHOD FOR REACTIVATING CATALYSTS

George Edward Liedholm, Long Beach, Calif., assignor to Shell Development Company, San Francisco, Calif., a corporation of Delaware Application June 15, 1939, Serial No. 279,247

5 Claims. (Cl. 196—52)

The present invention relates to a new and improved method for restoring the catalytic activity of inorganic catalytic materials which have become catalytically inefficient due to the deposition thereon of carbonaceous or other combustible material. More particularly the invention relates to an improved method for the removal of combustible material from inorganic catalyst masses having relatively low critical deactivation temperatures.

According to their behavior and the apparent mechanism of their action, catalysts may, in general, be divided into two groups according to whether the catalytic action is dependent solely upon the chemical constitution or is dependent to an appreciable extent upon the physical constitution and structure. As examples of catalytic materials belonging to the former category may be mentioned mineral acids, certain peroxides, catalysts of the Friedel-Craft type, etc. A few of the more common examples of catalysts of the second category are the natural and artificial alumina-, silica-, and magnesia-containing catalysts such as "Activated Alumina," alumina, bauxite, magnesia, silica gel, "Sil-O-Cel," "Filtrol," "Tonsil," the permutite catalysts, terrana, fuller's earth, kieselguhr, bentonite, infusorial earth, selected clays and the like; certain metal gel catalysts such as chromium, molybdenum, and tungsten oxide gels; and a great number of catalysts comprising the above and other materials in combination with metals, metal oxides, metal salts, etc.

The catalytic materials to which the present reactivation process is especially applicable comprise such catalysts of the latter category as are not appreciably affected by oxygen. Since by definition all catalytic materials of this category are dependent to a substantial extent upon their physical structure, they are hereinafter referred to as "structural catalysts." Whether a particular catalyst is to be considered a structural catalyst or not may depend in some instances upon the particular use in mind since some catalysts are capable of catalyzing various widely different reactions and may function chemically in one instance and structurally in another. Thus, for example, while the various acids of phosphorus chemically catalyze certain reactions, when these various acids are combined with certain siliceous minerals, the resultant material functions as a combination catalyst and is considerably dependent upon its physical and structural state.

One of the outstanding characteristics of structural catalysts is the possession of what may be termed a "critical deactivation temperature." Structural catalysts, it is found, remain substantially unchanged upon being subjected to increasingly elevated temperatures until a quite definite temperature, peculiar to each given catalyst, is reached at which the catalytic activity is lost. This critical temperature above which the catalytic activity of any given structural catalysts is lost and which, therefore, represents the maximum temperature to which any given catalyst may be safely heated, either during preparation or reactivation, is hereinafter designated as the "critical deactivation temperature." The deterioration of such catalysts upon heating at slightly above the characteristic critical deactivation temperature does not necessarily require that the structure shall be noticeably altered. In fact, the alteration in structure brought about by heating a structural catalyst for a short time at a temperature slightly above the critical deactivation temperature is usually not marked and in many cases can only be discerned by careful X-ray analysis or by activity tests.

Another characteristic which is quite often possessed by structural catalysts is a marked susceptibility of the catalytic activity to the effect of certain highly polar oxygen, sulfur and nitrogen compounds, such as $H_2O$, $H_2S$ and $NH_3$, etc. The catalytic activity of many structural catalysts, for example, depends to a considerable extent upon the presence of a small but very definite concentration of water.

Structural catalysts, such as those cited above, find numerous applications for a wide variety of chemical reactions, such, for example, as hydrogenation, dehydrogenation, destructive hydrogenation, isomerization of hydrocarbons, cyclization of hydrocarbons, aromatization of hydrocarbons, reforming of naphthas, cracking of petroleum products, polymerization of olefines, alkylation reactions, dehydration of alcohols, halogenation of hydrocarbons, dehydrohalogenation of halogenated hydrocarbons, the production of diaryl amines, and many others. In processes such as the above, economic or thermodynamic factors often necessitate executing the catalytic reaction at elevated temperatures and/or pressures under what may be termed conditions of incipient cracking. Under conditions of incipient cracking the catalyst mass gradually becomes coated with carbon or heavy tarry matter and gradually loses its efficiency. In many cases gum or resinous matter may be deposited upon the catalyst mass at much lower temperatures.

In such cases where the loss in catalytic activity is due to carbonaceous or other combustible deposits, the catalyst may usually be reactivated by oxidizing the deposited matter therefrom. This process is referred to as reactivation. In order to accomplish the reactivation with a minimum loss of catalytic activity, the oxidation, which is very exothermic, should be effected in a very carefully controlled manner and under such conditions that the critical deactivation temperature of the particular catalyst is at no time exceeded.

The present invention relates to a method for reactivating structural catalysts which is superior to any of the hitherto proposed methods in several important respects. The method of the invention allows the reactivation to be effected more economically, in less time, and in a simple, easily controllable manner. Other more particular advantages of the present method will be apparent in the following detailed description.

The attached drawing diagrammatically illustrates one assembly of apparatus suitable for reactivating catalysts according to the method of the invention. Referring to the drawing, 1 and 2 represent chambers, or converters, containing beds of catalysts and enclosed in a suitable furnace or heating chamber 3. While two catalyst chambers are shown, it is to be understood that only one chamber may be used or any number of additional chambers may be supplied and connected in parallel. The chambers 1 and 2, as shown, are provided with inlets 4 and 5 and outlets 6 and 7, from and to manifold pipes 8 and 9, respectively. These connections are for the introduction and removal of reactants and reaction products when employing the chambers alternately as reaction chambers and reactivation chambers. In such cases where the reactivation in situ is not possible or feasible and the chambers 1 and 2 are used solely for reactivating catalysts, these connections (4, 5, 6, 7, 8 and 9) may be dispensed with. When reactivating the catalyst in situ, it is usually advantageous to employ a plurality of chambers, one or more being "on stream" while the other, or others, cut out of the reaction circuit by valves 10 and 11 or 12 and 13, are being reactivated.

The catalyst chambers are provided with inlets 14 and 15, provided with suitable valves 16 and 17, connected to a manifold pipe 18, and outlets 19 and 20, provided with suitable valves 21 and 22, connected to a manifold pipe 23. These connections serve for the introduction and removal of reactivating gas to and from one or more of the chambers during reactivation periods. While the chambers may be in a vertical, horizontal or inclined position and while the reactivating gas or reactant may be introduced from the top or bottom or from either end, somewhat better results are obtained when the reactivating gas is introduced at the top and withdrawn from the bottom of the catalyst bed. The chambers may be of any of the many known designs, the only requirement being that the reactivating gas shall pass through the catalyst mass. In order that the temperatures during reactivation may be known, the chambers are preferably equipped with temperature measuring means, such as thermocouples 24 and 25, which allow the temperatures at any position throughout the length of the catalyst beds to be measured.

The intake manifold 18 and exit manifold 23 are connected through a cooler or heat exchanger 26, pipe 27 and valve 28, a compressor 29, pipe 30 and valve 31, and a heater or heat exchanger 32, to form a cyclic system. An inlet 32, provided with a regulating valve 33 for the introduction of a controlled amount of oxygen or oxygen-containing gas, is connected in the circuit on the high pressure side of the compressor to pipe 30. An outlet for spent reactivating gas and flushing gas 34 is connected in the circuit on the low pressure side of the compressor to pipe 27. The outlet is preferably provided with an automatic valve 35 for maintaining a constant pressure in the circuit and a by pass exit-valve 36. A gas holder 37, capable of holding sufficient inert gas at the operating pressure to flush the catalyst chamber or chambers, both before and after reactivation without being replenished, is connected across the circuit between pipes 30 and 27 by means of pipes 38 and 39. Pipe 38 is preferably provided with a pressure-regulated valve, check valve or other suitable valve 40. A valve 41 is provided in pipe 39 for introducing flushing gas into the circuit. The gas holder 37 may also, if desired, be provided with a valved inlet 42 for initially filling the circuit with inert gas, or for introducing special chemicals etc.

If it is assumed, for the purpose of illustration, that the reactivation of chamber 1 is being completed and reactor 2 has been processing, then the system functions approximately as follows. Valves 33 and 28 close and valves 36 and 41 open and the system, including reactor 1, is purged of oxygen-containing gases by means of inert gas from gas holders 37, flowing via pipe 39, valve 41, pipe 27, compressor 29, pipe 30, valve 31, (or in lieu of valve 31, pipe 44, valve 45, cooler 43, pipe 47, separator 46, and pipe 48) pipe 30, preheater 32, pipe 18, valve 16, pipe 14, reactor 1, pipe 19, valve 21, pipe 23, cooler 26, pipe 27, and valve 36. Valves 16, 21, 12 and 13 then close and valves 17, 22, 10 and 11 open. This purges reactor 2 with inert gas from the gas holder 37 and puts reactor 1 back on stream. If the residual reactant is a liquid at the operating temperature, it may be allowed to drain, may be removed by means of steam or a solvent or the removal may be assisted by applying a vacuum at the outlet 36 while valve 17 is nearly closed. After the catalyst chamber has been flushed with inert gas, valves 36 and 41 close and valves 33 and 28 open. An oxygen-containing gas, such as air, is forced into the recycling gas via the inlet 32 and flow regulating device 33. The excess oxygen-free gas, instead of leaving the system via outlet 34, passes through the pressure regulated valve 40 and line 38 to refill the gas holder. As soon as the gas holder reaches the operating pressure, the excess inert gas passes out of the system via the pressure regulated valve 35. Upon completion of the primary reactivation, the gas being recycled rapidly increases in oxygen concentration due to the continued addition of air. After the catalyst has been sufficiently reactivated, valves 33 and 28 close and valves 36 and 41 open. As soon as the reactor has been purged of oxygen-containing gases, valves 17 and 22 close, valves 12 and 13 open and reactor 2 is again on stream while another catalyst chamber is being flushed and reactivated.

The preheater 32 which may be a separate heating unit, a heat interchanger, or built in as an integral part of the furnace 3, is preferably employed to preheat the reactivating gas prior to its entrance into the catalyst chamber. In general, the gases are preferably preheated to a temperature sufficiently high to initiate the oxidation reaction. The optimum temperature of the reactivating gases entering the catalyst chamber may vary considerably depending upon the particular circumstances and may even vary during the progress of the reactivation.

As pointed out above, many structural catalysts are very sensitive to water. In order to maintain the optimum efficiency of catalysts of this type, it is found that the water content of the reactivating gas, as well as the reactants, should be maintained constant within a narrow preferred range of low concentrations. If ordinary air or other fairly wet gas is applied to reactivate catalysts of this type, it is found that the reactivated catalyst, upon being put back on stream, often requires a certain induction period before returning to its normal activity. By maintaining the water content of the reactivating gases at the optimum value for the particular catalyst, it is found that such induction periods are entirely eliminated and that the reactivated catalyst immediately assumes its normal activity upon being put back "on stream." This is illustrated by the following Table I in which are tabulated the catalytic conversions obtained with a particular representative alumina catalyst after being reactivated with reactivating gas containing varying concentrations of water vapor, showing the effect of the induction period, i. e. time required before the catalyst reaches a point of maximum activity.

TABLE I

| Percent by weight of H₂O present in reactivating gas | Percent conversion after catalyst has been on stream after reactivation | | | |
|---|---|---|---|---|
| | 5 min. | 10 min. | 20 min | 30 min. |
| 0.18 | 34 | 32 | 29 | 27.5 |
| 1.2 | 25.5 | 27 | 29 | 27 |
| 4.2 | 19 | 26 | 28 | 28.5 |

When it is considered that the usual "on stream period" of this catalyst, like many others, is only about one hour, it is seen that an induction period, even if only a few minutes, represents a material decrease in the production capacity of the catalyst chamber and is to be avoided.

According to the process of the present invention the water content of the reactivating gas may be easily and positively fixed and maintained at the desired concentration; the method is, therefore, especially advantageous for the reactivation of such catalysts as are sensitive to water vapor. Thus, according to the preferred embodiment of the present process, the recycled reactivating gas passes through a suitable cooling device 43, of any conventional design, such as a coil cooler, water cooler, radiator, heat exchanger or the like, via pipes 30, 44 and valve 45. When the cooler is used, valve 31 is preferably closed. The compressed and cooled gases may then pass to a suitable separating device or tank 46, via a line 47, if desired, to separate the condensed water. The reactivating gas of controlled water concentration is continuously fed to the manifold 18 via lines 48 and 30 and heater 82 while the condensed water is removed from the system via outlet 49.

For many catalysts, especially those containing "Activated Alumina," the best results are obtained when the water content of the reactivating gas is maintained between about 0.01 and 5% and preferably at about 0.2%. This or any other preferred concentration of water vapor may be easily and accurately regulated and maintained, in the present process, by regulating the temperature and/or the pressure in the separator. Thus, for example, if the separator is maintained at 75° F. and a pressure of 110 pounds per square inch, the water content of the reactivating gas is automatically fixed and maintained at 0.2%. If desired, appropriate chemicals may be placed in the circuit, preferably in the cooler 43 or separator 46, to remove any volatile catalyst poisons which may be introduced by the air or tend to accumulate in the recycled reactivating gas. In fact, since, as more clearly described below, the present process is preferably executed under an appreciable pressure, the removal of undesirable materials from the reactivating gas, according to the invention, is greatly facilitated.

In view of the description of the purpose and function of the various apparatus diagrammatically shown in the drawing, it will be apparent that many modifications of the preferred illustrated assembly are possible without departing from the spirit of the invention. For example, the inlet 32 may be placed in the circuit at any position from beyond the outlet to the gas holder, in the direction of flow, up to the catalyst bed; the cooler and separator may be placed beyond the air inlet, in the direction of flow; the outlet 34 may be placed on either side of the cooler 26; the cooler 26 and preheater 82 may be put in heat interchange relation; the inert reactivating gas may be stored at lower pressure and charged to the circuit by a compressor; the arrangement and type of the valves and control devices may be varied, etc.

As explained above, structural catalysts are usually characterized by a definite and characteristic critical deactivation temperature peculiar to each individual catalyst. One of the major problems in the reactivation of these catalysts is, therefore, to effect the oxidation of the deposited combustible matter from the catalyst mass as completely as possible, in as short a time as possible, and without at any time allowing the temperature to exceed the particular critical deactivation temperature. The problem is made especially difficult in many cases by the fact that reactivation must of necessity be carried out above the ignition temperature of the deposited material, and this, in the case of many of the more active catalysts, is quite close to the critical deactivation temperature.

The more important factors which have a direct influence upon the speed, efficiency and temperature of the reactivation process are the oxygen concentration, pressure, and space velocity of the reactivating gases. The space velocity, as herein used, is defined as the number of volumes of reactivating gas, measured at 32° F. and atmospheric pressure, which is passed through a unit volume of catalyst bed per minute. These factors are interrelated and may, consequently, be varied over a considerable range. Upon considering the prior art practice with regard to these factors, it is seen that the common practice has hitherto been to employ low space velocities, and to begin the reactivation with a gas containing a low concentration of oxygen (for example, 2%) and gradually increase the oxygen concentration during the reactivation. I have found that these are not the preferred conditions for the reactivation and that by employing different conditions a quicker and more perfect reactivation may be more economically achieved.

A study of the reactivation of structural catalysts has unexpectedly shown that high space velocities, pressure and, in general, a decreasing concentration of oxygen in the reactivating gas during the primary reactivation materially increase the efficiency of the reactivation. These preferred conditions, singly and especially in combination, when employed in a cyclic system such as above described, afford an advantageous and attractive process.

Under the preferred conditions of the present process, it is found that the primary reactivation does not take place simultaneously throughout the catalyst bed, but is confined to a relatively thin section which propagates from the inlet (or inlets, in case a special converter is employed wherein the reactivating gas is simultaneously introduced at a plurality of points throughout the catalyst bed) of the reactivating gas, in the direction of flow. This narrow zone of reaction which becomes more pronounced as the pressure is decreased, represents the hottest portion of the catalyst mass during the reactivation and is hereinafter referred to as the "hot zone."

The oxygen concentration of the reactivating gas entering the catalyst chamber is preferably adjusted by either the rate of introduction of air or the rate of recycling to maintain the temperature of the hot zone safely below the critical deactivation temperature. If the temperature of the hot zone is adjusted considerably below the critical deactivation temperature, the oxygen concentration of the reactivating gas may be gradually increased somewhat or maintained constant throughout the primary reactivation period. If, however, as is usually the case, it is desired to effect the reactivation in the shortest possible time, the temperature of the hot zone at the beginning of the reactivation should be adjusted close to the desired upper temperature limit and maintained at this temperature throughout the primary reactivation period by controlling the oxygen concentration of the reactivating gas. This may be illustrated by the following example:

Example

Experiments on the reactivation of a bed of activated alumina-base catalyst while employing a space velocity of reactivating gas of about 110, showed that in order to effect the reactivation in the shortest possible time while maintaining the maximum temperature below 1150° F., the oxygen concentration in the reactivating gas should be gradually reduced from about 2.1% to 1.2%. If the oxygen concentration is maintained at 1.2% the reactivation requires almost twice as long. If, on the other hand, the oxygen concentration is maintained at 2.1% the catalyst is subjected to a temperature of about 1370° F.

The advantage of maintaining the temperature of the hot zone as close as possible to a safe temperature somewhat below the critical deactivation temperature by regulating the oxygen concentration during the reactivation will be apparent when it is considered that the rate of reactivation, when employing a given space velocity, is dependent upon the oxygen concentration. Thus, whereas it requires 42 minutes to reactivate a 4.5 foot bed of a given catalyst using a space velocity of 123 and an oxygen concentration of 1.32%, the time required when the oxygen concentration is raised to 2.65% is only 22 minutes. Since the most economical "on stream period" between reactivations is often less than one hour (40 minutes in the case of the particular catalyst in question), it is seen that by executing the reactivation in the above-described manner with decreasing oxygen concentrations, the ratio of the time on stream to the reactivation, and hence the production capacity of the converter, may be materially increased.

The rate at which the reactivating gas is passed through the catalyst bed (i. e. the space velocity) while maintaining the maximum hot zone temperature below any given limit, is dependent somewhat upon the oxygen concentration of the reactivating gas and may, therefore, like the oxygen concentration, be varied over a wide range. Thus, for example, space velocities varying from about 10 up to several hundred may be used. Although space velocities as low as 10, for instance, may be employed, it is found that the reactivation, other things being equal, proceeds better and faster if the space velocity is increased to at least 30.

In the preferred embodiment of the present process space velocities of at least 40 and preferably between about 80 and 200 are used. Although space velocities above 40 would be impractical in the older non-cyclic reactivation processes, the present reactivation process allows these high and more advantageous space velocities to be practically employed in a very economical manner. This is accomplished by the application of the above-described cyclic system of operation and by executing the reactivation under a substantial pressure. According to the process of the invention the pressure of the recycled gas leaving the catalyst bed is maintained above about 2 atmospheres absolute pressure and is preferably considerably higher. The use of superatmospheric pressure is advantageous since it affords better dissemination of the heat of reaction, allows the more preferred higher space velocities to be economically employed, and allows the reactivation to be effected with a minimum power consumption. Since the advantages realized by the use of superatmospheric pressure are more marked the larger the size of the catalyst bed to be reactivated, the present process is especially advantageous for the reactivation of large commercial converters.

As pointed out in the above descriptions of the method and preferred conditions for the execution of the reactivation, the process of the invention completely eliminates the necessity of generating inert gas by a separate combustion of hydrocarbons; it eliminates the danger of poisoning the catalyst by sulfur or other compounds which are present in flue gas; the water content of the reactivating gas is easily fixed and maintained at any desired concentration; inert gas for purging the catalyst before and after the reactivation is automatically stored up during the reactivation process; and the reactivation is effected in the shortest possible time. The present process allows, however, further unexpected and important advantages to be realized. One of these advantages is the efficiency and completeness of the reactivation afforded. This is the result of both the application of pressure and the cyclic system of operation. Thus, it is found that while the greater part of the combustible deposits is found on or near the surface of the catalyst, an appreciable portion is usually deposited in the interior of the catalyst. This more inaccessible material is more efficiently removed under the conditions of the present process. Also, a certain minor proportion of the combustible material is usually found to deposit in a hard, more refractory form. In the present process the oxygen concentration in the reactivating gas is automatically increased to more effectively remove these more refractory and inaccessible residues just as soon as such increased oxygen concentration is allowable without the generation of excessive temperatures. Thus, when the hot zone reaches the end of the catalyst bed at the end of the primary reactivation, it disappears and the oxygen concentration in the reactivating gas immediately increases. A short period of recirculation of the reactivating gas after the hot zone has disappeared does not involve any danger of overheating and may help to remove any remaining more refractory or relatively inaccessible deposits which may have escaped removal during the primary reactivation. In fact, it is desirable to increase the rate of introduction of air as soon as the primary reactivation is completed. This point can very advantageously be determined by means of an automatic oxygen recorder (not shown) connected to the system.

Another important advantage of the present process, afforded by the cyclic system and the use of pressure, is a materially decreased power requirement. When it is considered, as an illustrative example, that about 6,000 cubic feet of reactivating gas of 2% oxygen concentration is usually passed through a cubic foot of catalyst during a reactivation, and that in many catalytic installations at least one bank of converters is always "on reactivation," it will be apparent that the power requirement of a reactivation process is an important item. The power consumption required by the present process is reduced to a minimum by executing the process in the above-described cyclic system under a suitable elevated pressure. Thus, with a given catalyst bed and space velocity, the power requirement is dependent upon the pressure under which the reactivation is executed and is lowest when moderately high pressures are employed. This is illustrated in the following table showing the power required to reactivate a 4.5 foot bed of 8–14 mesh catalyst using a space velocity of about 110, as the pressure, measured at the exit of the reactivation chamber, is increased from 1 to about 10 atmospheres.

TABLE II

| Pressure (in pounds per square inch, gauge) | Horsepower required |
| --- | --- |
| 0 | 15 |
| 15 | 10 |
| 30 | 7 |
| 45 | 5 |
| 60 | 4.5 |
| 75 | 4.0 |
| 100 | 3.8 |
| 150 | 3.6 |

If the pressure is further increased, the required power gradually increases due to the power required to introduce the oxygen-containing gas into the system. As is apparent from the above table, by employing pressures varying from about 3 to about 10 atmospheres absolute, the power requirement is reduced to about one-half to one-fourth of that required if no pressure is employed.

The present process is generally applicable to the reactivation of structural catalysts, the catalytic activity of which has been impaired by the deposition thereon of carbonaceous or other combustible material. In view of the special advantages of the process, it is, however, especially suitable and most advantageous when applied for the reactivation of structural catalysts, such as, in particular, "Activated Alumina"-base catalysts, such as are used in the catalytic dehydrogenation of gaseous hydrocarbons. These catalysts, which are sensitive to water and have quite low critical deactivation temperatures are, therefore, especially sensitive to variations in the reactivation conditions. When reactivated according to the present process, these catalysts are not only reactivated most economically but may, in general, be reactivated several hundred times before being replaced. Since, in many catalytic conversions of hydrocarbons the catalyst is used for only short periods and reactivated many times before being replaced, the reactivation is an essential step in the economical execution of these processes and the present reactivation process, may, therefore, also be considered as an advance in the art of catalytically converting hydrocarbons.

I claim as my invention:

1. In a process for the conversion of hydrocarbons in contact with an inorganic structural catalyst, the step of periodically reactivating said catalyst, after its catalytic efficiency has become impaired by deposition of carbonaceous material thereon, by flushing substantially free of hydrocarbons with inert reactivating gas stored from a previous reactivation, recycling reactivating gas at a space velocity of at least 30 through the catalyst while under a pressure of at least two atmospheres, continuously replacing a portion of said recycled gas with air and withdrawing oxygen-free gas to storage, and maintaining the desired temperature of the reactivation substantially constant during the primary reactivation by regulating the concentration of oxygen in the reactivating gas passing through the catalyst.

2. A process for removing combustible deposits from inorganic structural catalysts and thereby restoring their catalytic activity which comprises recycling a relatively inert reactivating gas of low and controlled oxygen concentration from a previous reactivation under a pressure of at least 2 atmospheres and at a space velocity of at least 30 through a bed of said catalyst to be reactivated, continuously introducing air into said recycled gas, removing and storing oxygen-free gas from the recycle system, and maintaining the temperature of the reactivation in said catalyst during the primary reactivation at a desired level above the ignition temperature of the combustible deposit but below the critical deactivation temperature of the catalyst by regulating and progressively decreasing the oxygen concentration in the reactivating gas passing through the catalyst.

3. In a process for the dehydrogenation of gaseous hydrocarbons in contact with an inorganic structural catalyst sensitive to water vapor, the step of periodically reactivating said catalyst after its catalytic efficiency has become impaired by deposition of carbonaceous material thereon, by flushing substantially free of hydrocarbons with inert reactivating gas stored from a previous reactivation, recycling reactivating gas at a space velocity of at least 30 through the catalyst while under a pressure of at least two atmospheres, continuously replacing a portion of said recycled gas with air and withdrawing oxygen-free gas to storage, maintaining the water content of the reactivating gas at a low desired value by cooling under pressure, and maintaining the desired temperature of the reactivation substantially constant during the primary reactivation by regulating the concentration of oxygen in the reactivating gas passing through the catalyst.

4. In a process for the conversion of hydrocarbons in contact with an inorganic structural catalyst, the step of periodically reactivating said catalyst, after its catalytic efficiency has become impaired by deposition of carbonaceous material thereon, by flushing substantially free of hydrocarbons with inert reactivating gas stored from a previous reactivation, recycling reactivating gas at a space velocity of at least 30 through the catalyst while under a pressure of at least two atmospheres, continuously replacing a portion of said recycled gas with air and withdrawing oxygen-free gas to storage, maintaining the desired temperature of the reactivation substantially constant during the primary reactivation by regulating the concentration of oxygen in the reactivating gas passing through the catalyst, increasing the oxygen concentration of the recycled gas as soon as the primary reactivation is finished, and finally purging the system of oxygen with inert reactivating gas from storage.

5. In a process for the conversion of hydrocarbons in contact with an inorganic structural catalyst, the step of periodically reactivating said catalyst after its catalytic efficiency has become impaired by deposition of carbonaceous material thereon, by flushing substantially free of hydrocarbons with inert reactivating gas stored from a previous reactivation, recycling reactivating gas at a space velocity of from 80 to 200 through the catalyst while under a pressure of at least two atmospheres, continuously replacing a portion of said recycled gas with air and withdrawing oxygen-free gas to storage, and maintaining the desired temperatures of the reactivation substantially constant during the primary reactivation by regulating the concentration of oxygen in the reactivating gas passing through the catalyst.

GEORGE EDWARD LIEDHOLM.